(12) United States Patent
Kim et al.

(10) Patent No.: US 10,259,352 B2
(45) Date of Patent: Apr. 16, 2019

(54) RECLINING DEVICE FOR VEHICLE SEAT

(71) Applicants: Ki Hong Kim, Ulsan (KR); Meang Ho Kim, Ulsan (KR)

(72) Inventors: Ki Hong Kim, Ulsan (KR); Meang Ho Kim, Ulsan (KR)

(73) Assignee: DAS CO., LTD. (KR)

( * ) Notice: Subject to any disclaimer, the term of this patent is extended or adjusted under 35 U.S.C. 154(b) by 107 days.

(21) Appl. No.: 15/474,362

(22) Filed: Mar. 30, 2017

(65) Prior Publication Data

US 2018/0001796 A1 Jan. 4, 2018

(30) Foreign Application Priority Data

Jun. 29, 2016 (KR) .................. 10-2016-0081470

(51) Int. Cl.
 *B60N 2/235* (2006.01)
(52) U.S. Cl.
 CPC .................... *B60N 2/236* (2015.04)
(58) Field of Classification Search
 CPC ........................................... B60N 2/236
 USPC ....................................... 297/367 P
 See application file for complete search history.

(56) References Cited

U.S. PATENT DOCUMENTS

| 2011/0025114 A1* | 2/2011 | Berndtson | ............ | B60N 2/236 |
| | | | | 297/367 P |
| 2014/0159458 A1* | 6/2014 | Lu | ............ | B60N 2/2356 |
| | | | | 297/366 |

FOREIGN PATENT DOCUMENTS

| CN | 102131673 A | 7/2011 |
| CN | 102951043 A | 3/2013 |
| KR | 10 0844355 A | 7/2008 |
| KR | 20090100311 A | 9/2009 |
| KR | 10 2014 0001651 A | 1/2014 |
| KR | 10 2014 0027548 A | 3/2014 |
| WO | 2013/004471 A1 | 1/2013 |

OTHER PUBLICATIONS

Korean Office Action for Application No. 10-2016-0081470 dated Apr. 27, 2017.
Chinese Office Action corresponding to Chinese Patent Application No. 2017101732195 dated Dec. 28, 2018.

* cited by examiner

*Primary Examiner* — Milton Nelson, Jr.
(74) *Attorney, Agent, or Firm* — Tarolli, Sundheim, Covell & Tummino LLP

(57) ABSTRACT

Disclosed herein is a reclining device for a vehicle seat, which includes a plate holder, a sector tooth rotatably inserted into the plate holder, a pawl tooth engaged with the sector tooth, an operating cam to move the pawl tooth by rotation thereof to fix the sector tooth, a guide bush press-coupled to the operating cam and having a sealing protrusion to support a cam spring, a hollow operation shaft to rotate the operating cam, and the cam spring to restore the operating cam rotated by the operation shaft. Thus, it is possible to prevent a solution for an electrodeposition from infiltrating into the reclining device, to secure a space in which the cam spring is smoothly operated, and to contribute to a reduction in weight by use of the hollow shaft.

6 Claims, 11 Drawing Sheets

RECLINING DEVICE FOR VEHICLE SEAT

BACKGROUND OF THE INVENTION

Field of the Invention

Exemplary embodiments of the present invention relate to a reclining device for a vehicle seat, and more particularly, to a reclining device for a vehicle seat which is capable of adjusting an inclination of a seat back relative to a seat cushion.

Description of the Related Art

In general, a variety of convenient devices are provided in a driver seat, a passenger seat, and seats for other passengers, which are installed in the front and rear of a vehicle interior, for comfortableness of occupants.

The convenient devices have a sliding function of adjusting a seat by pushing or pulling it in a forward or backward direction and a reclining function of adjusting the inclination of a backrest (seat back), according to the body type of an occupant.

Particularly, this reclining function is implemented by a recliner to adjust the angle of a seat back relative to a seat cushion.

The recliner is configured to enable the seat back to switch between a locked state, in which it is fixed to the seat cushion at a certain angle, and an unlocked state in which it is pivotable relative to the seat cushion.

In connection with such a recliner, Korean Patent Application Publication No. 10-2009-0100311 discloses an example of a conventional reclining device for a vehicle seat including a recliner.

As illustrated in FIGS. 1 to 3, a conventional recliner 100 includes a plate holder 110, a sector tooth 120, an operating cam 140, a plurality of pawl teeth 130, and a cam spring 150.

The plate holder 110 is connected to one of a seat cushion frame and a seat back frame through one of an upper bracket 300 and a lower bracket 200. The sector tooth 120 is a component that is connected to the other of the seat cushion frame and the seat back frame through the other of the upper bracket 300 and the lower bracket 200. The sector tooth 120 is inserted into the plate holder 110 so as to be rotatable about an axis of rotation X-X', and has a shaft through-hole 122 formed in the center thereof so that an operation shaft 160 is fitted through the shaft through-hole 122.

Here, after the assembly of the recliner 100, a solution for an electrodeposition is applied to the outside of the recliner. In this case, the parts of the recliner may be corroded by the infiltration of the solution for the electrodeposition into the gap between the shaft through-hole 122 of the sector tooth 120 and the operation shaft 160.

Meanwhile, a study has been continuously performed to reduce the total weight of the recliner 100 for a reduction in manufacturing costs, but the existing operation shaft 160 is very heavy since it is a solid shaft with predetermined torque.

The operating cam 140 serves to vertically move the pawl teeth 130 while rotating by the rotational force transmitted from the operation shaft 160, and to maintain the plate holder 110 and the sector tooth 120 in a locked state or change the state between them to an unlocked state. The operating cam 140 is disposed between the plate holder 110 and the sector tooth 120, and has a shaft hole 141 formed in the center thereof so as to rotate integrally with the operation shaft 160 that is inserted through the shaft hole 141. The operating cam 140 has a spring boss 143 that is formed around and protrudes from the shaft hole 141 in the center of the operating cam, wherein the cam spring 150 between the sector tooth 120 and the operating cam 140 is installed to the spring boss 143, and a spring fixing protrusion 144, to which a second end 153 of the cam spring 150 is latched, is formed on the outer peripheral surface of the spring boss 143. In addition, the operating cam 140 has a plurality of ring-shaped release protrusions 142 formed on the outer peripheral surface thereof, the release protrusions 142 protruding radially outward. The release protrusions 142 are components corresponding to engagement protrusions 132 of the pawl teeth 130, which will be described later. When the operating cam 140 rotates, the release protrusions 142 move the pawl teeth 130 in a radially inward direction while engaging with the engagement protrusions 132, with the consequence that the plate holder 110 and the sector tooth 120 are unlocked.

The pawl teeth 130 are inserted into the plate holder 110 and are engaged with or disengaged from an internal gear 123 of the sector tooth 120 while reciprocating radially by the rotation of the operating cam 140, thereby performing the locking/unlocking action of the recliner 100. The cam spring 150 has a spiral shape and serves to provide a restoring force to the operating cam 140.

SUMMARY OF THE INVENTION

Accordingly, the present invention has been made in view of the above-mentioned problems, and an object thereof is to provide a reclining device for a vehicle seat which is capable of preventing a solution for an electrodeposition from infiltrating into the reclining device, of securing a space in which a cam spring is smoothly operated, and of contributing to a reduction in weight by use of a hollow shaft.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a reclining device for a vehicle seat, which is provided between an upper bracket connected to a seat back frame and a lower bracket connected to a seat cushion frame so as to adjust an angle of the seat back frame, the reclining device for a vehicle seat includes a plate holder coupled to the lower bracket and having a plurality of guide protrusions formed on one surface thereof, a sector tooth rotatably inserted into the plate holder and having an internal gear formed on an inner peripheral surface thereof, a pawl tooth slidably provided in a space between the guide protrusions and having an external gear engaged with the internal gear of the sector tooth, an operating cam configured to move the pawl tooth by rotation thereof to engage the external gear with the internal gear of the sector tooth, a guide bush integrally and rotatably coupled to the operating cam and having a first through-hole formed in a center thereof, the guide bush including a spring fixing portion formed at one side thereof to support one end of a cam spring, an operation shaft spline-coupled to the first through-hole of the guide bush to rotate the operating cam, and the cam spring, one end of which is supported by the plate holder while the other end thereof is supported by the spring fixing portion of the guide bush, so as to restore the operating cam rotated by the operation shaft.

The guide bush may include a boss fitted to the sector tooth, and a sealing protrusion formed on an outer peripheral surface of the boss to prevent the solution for the electrodeposition from being introduced between the boss and the sector tooth.

The operating cam may be formed with a bush coupling hole into which the guide bush is fitted, the guide bush may include a tubular bush body fitted into the bush coupling hole of the operating cam, a recessed hole may be formed in an inner wall of the bush coupling hole, a pressing protrusion may be formed on an outer peripheral surface of the bush body to be press-fitted into the recessed hole, and the pressing protrusion may have a plurality of convex ridges such that the pressing protrusion is pressed by contact with an inner wall of the recessed hole at multiple pressing points.

The recessed hole may have a trapezoid shape, and the pressing protrusion may have two of the ridges so as to come into contact with the inner wall of the trapezoid-shaped recessed hole at four of the pressing points.

The spring fixing portion may protrude in an axial direction of the bush body so as to secure an accommodation space, in which the cam spring is operable, between the guide bush and the operating cam by preventing the operating cam from being axially inserted over a thickness of the cam spring when the operating cam is fitted on the bush body.

The reclining device may further include a spring stopper formed at a side opposite to the spring fixing portion on the outer peripheral surface of the bush body while protruding by the same thickness as the spring fixing portion, so as to secure an accommodation space, in which the cam spring is operable, between the guide bush and the operating cam by preventing the operating cam from being axially inserted over a thickness of the cam spring when the operating cam is fitted on the bush body.

The operation shaft may be a hollow shaft.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
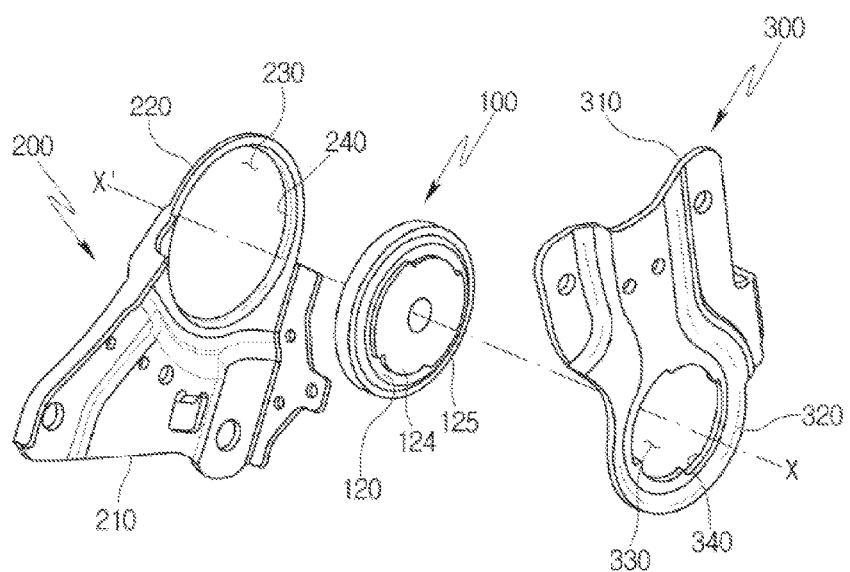
FIGS. 1 to 3 are perspective views illustrating a reclining device for a vehicle seat according to the related art.
Figure 2:
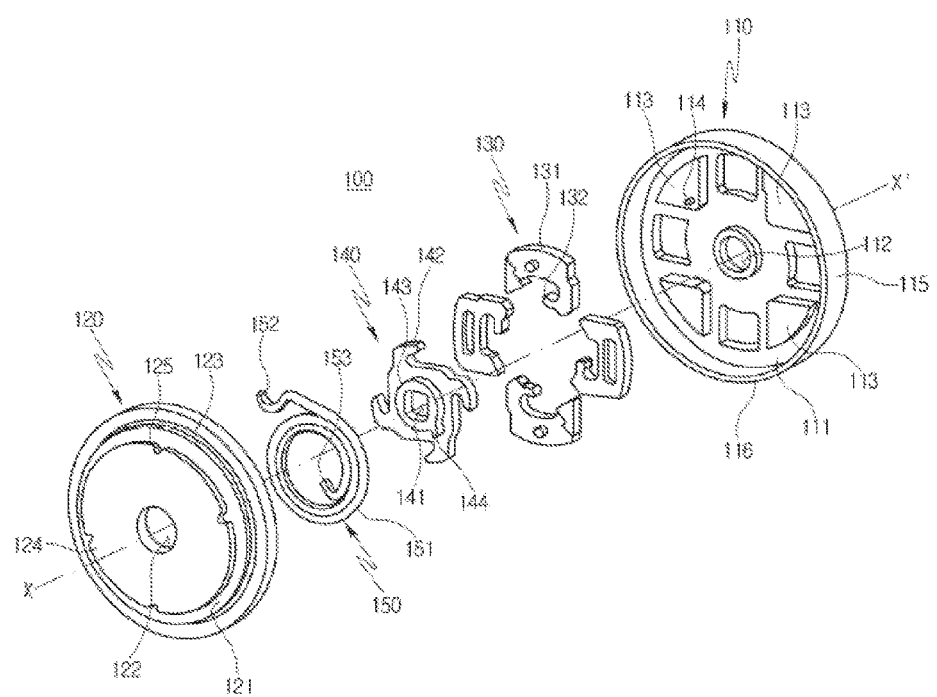

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Referring to FIGS. 4 to 11, a reclining device for a vehicle seat according to an embodiment of the present invention includes a plate holder 10 having a plurality of guide protrusions 11 formed on one surface thereof, a sector tooth 20 that is rotatably inserted into the plate holder 10 and has an internal gear 21 formed on the inner peripheral surface thereof, pawl teeth 30 having external gears 31 that engage with the internal gear 21 of the sector tooth 20, an operating cam 40 that move the pawl teeth 30 by rotation thereof to engage the external gears 31 with the internal gear 21 of the sector tooth 20, a guide bush 50 that is integrally and rotatably coupled to the operating cam 40, an operation shaft 70 that rotates the operating cam 40, and a cam spring 60 that restores the operating cam 40 rotated by the operation shaft 70.

The pawl teeth 30 are slidably provided in respective spaces between the guide protrusions 11 of the plate holder 10. Thus, the pawl teeth 30 controls the rotation of the sector tooth 20 by selective engagement of the external gears with the internal gear 21 of the sector tooth 20 while the pawl teeth 30 slide in the radial direction of the plate holder 10.

The operating cam 40 is rotated along with the guide bush 50 by the operation shaft 70. The operating cam 40 has a bush coupling hole 41 formed in the center thereof so that the guide bush 50 is fitted into the bush coupling hole 41.

The guide bush 50 has a tubular bush body 51 that is fitted into the bush coupling hole 41 of the operating cam 40. The bush body 51 has a first through-hole 52 formed in the center thereof, and the operation shaft 70 is spline-coupled to the first through-hole 52.

Figure 3:
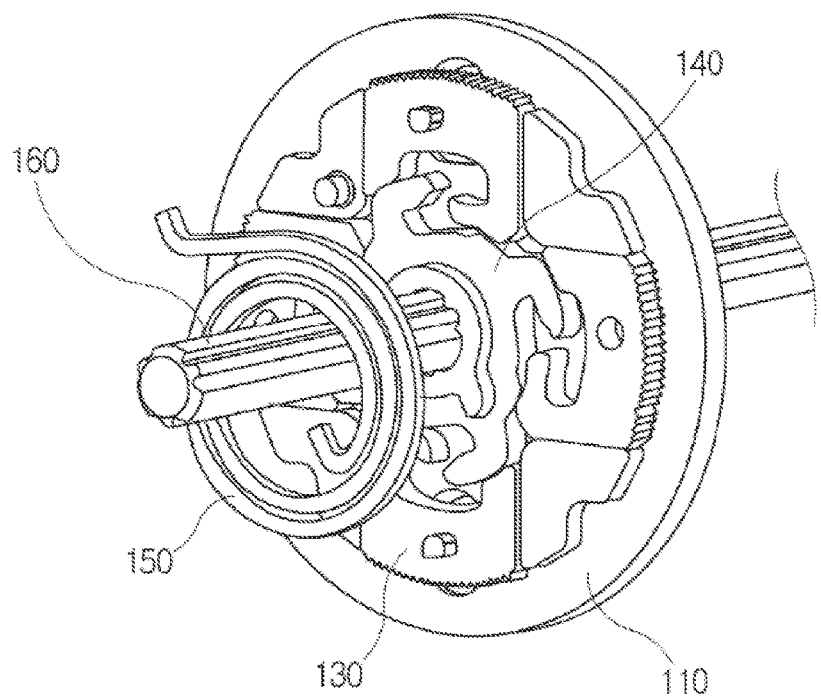
Figure 4:
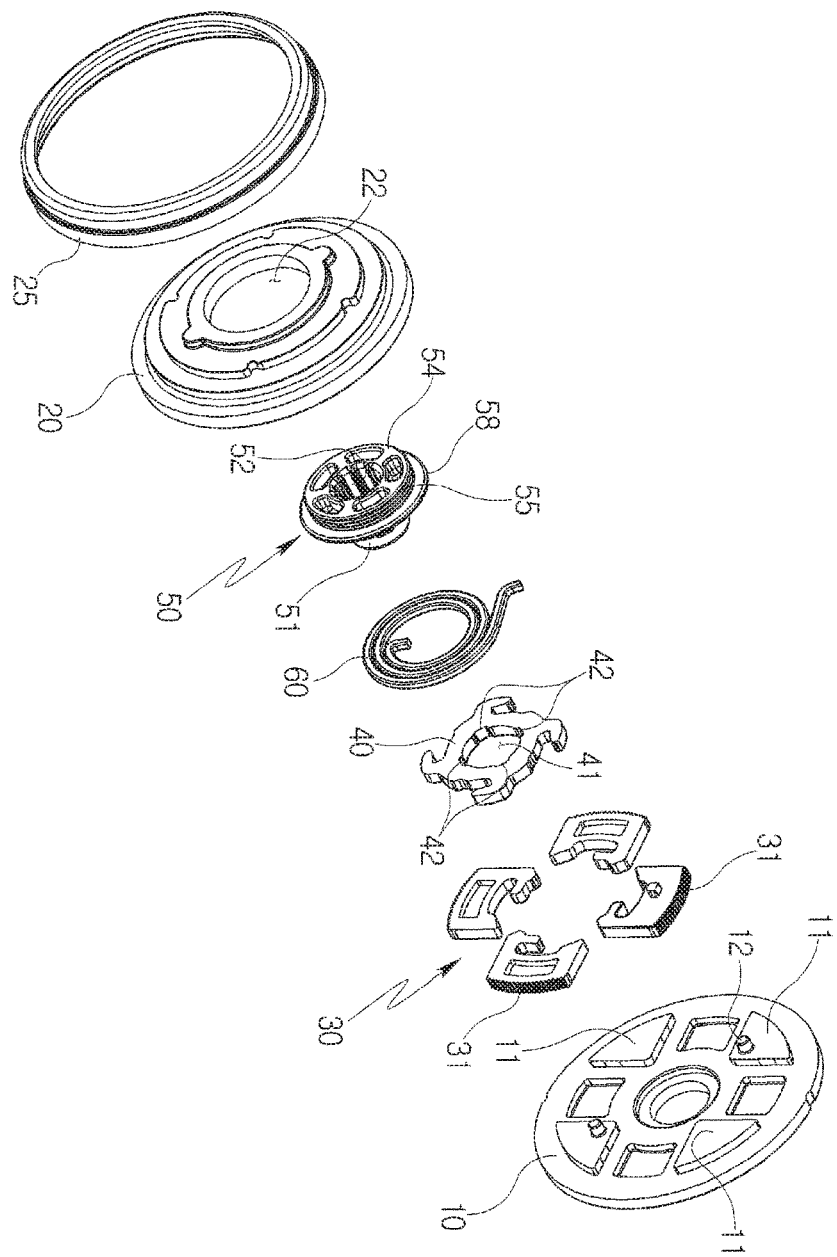
FIGS. 4 and 5 are exploded perspective views illustrating a reclining device for a vehicle seat according to an embodiment of the present invention.
Figure 5:
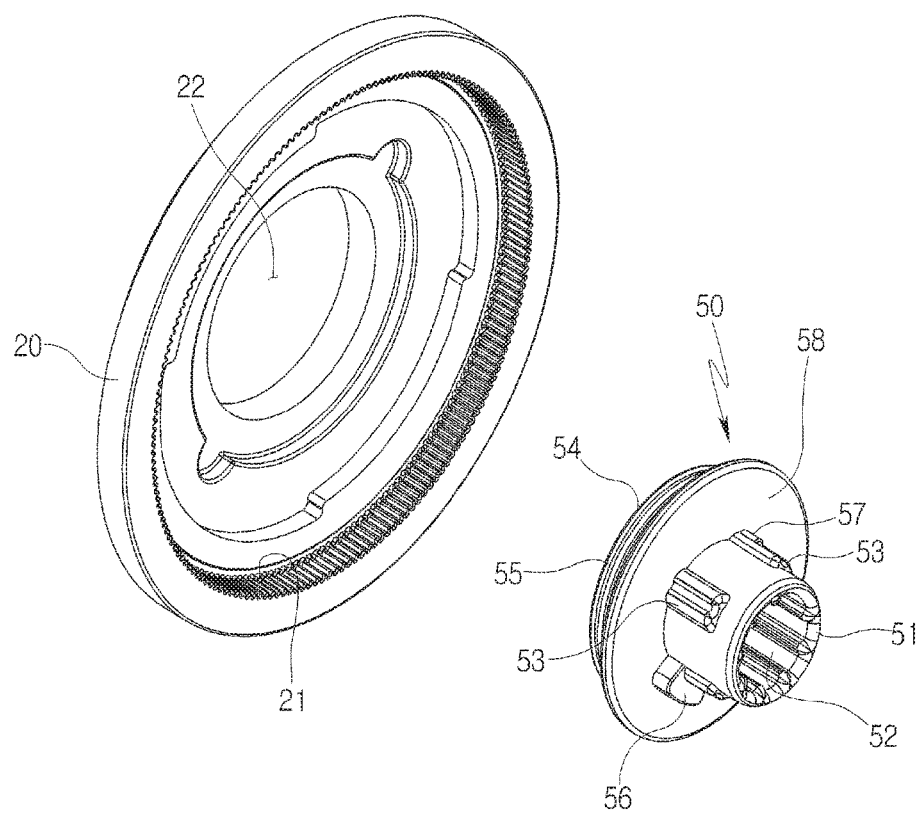
Figure 6:
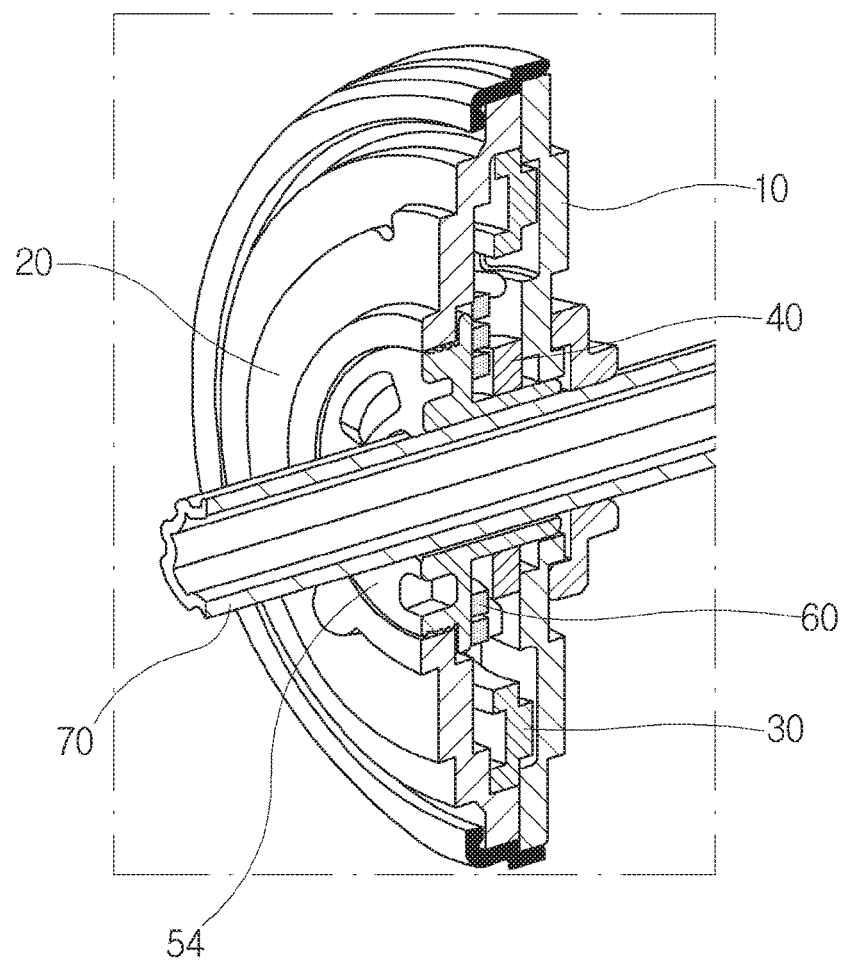
FIGS. 6 and 7 are assembled perspective views of the reclining device for a vehicle seat illustrated in FIG. 4.
Figure 7:
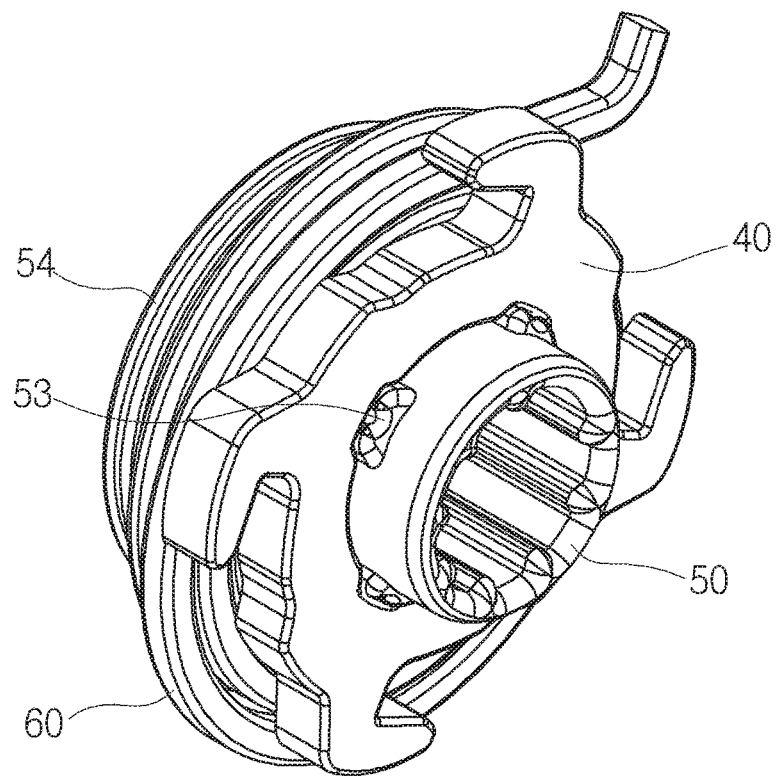
Figure 8:
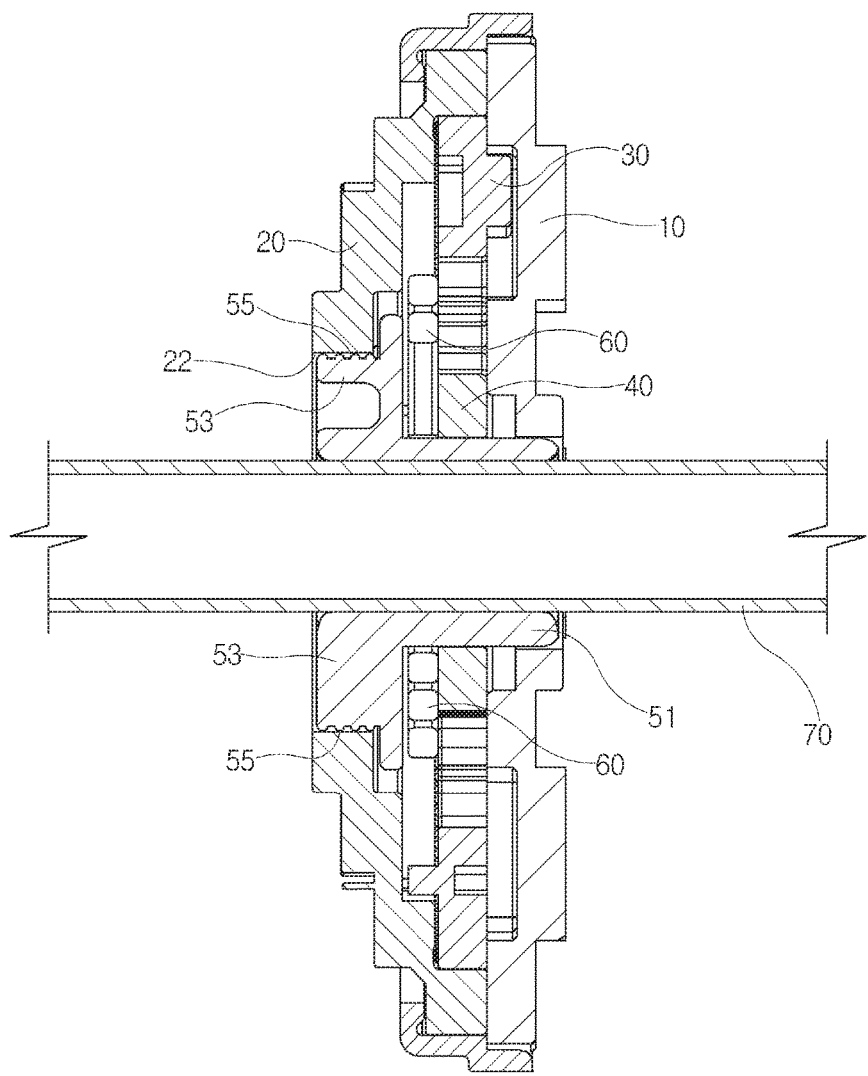
FIG. 8 is an assembled cross-sectional view of the reclining device illustrated in FIG. 6.

Here, the existing operation shaft (see FIG. 3) is a solid shaft, but the operation shaft 70 of the present invention is a hollow shaft and thus contributes to a reduction in weight. The operation shaft 70 of the present invention has a larger diameter than the existing operation shaft in order to have the same torque as the existing operation shaft. In addition, the operating cam 40 must have a larger diameter through-hole than the existing one such that the operation shaft 70 may be fitted into the through-hole. In this case, since it is difficult for a spring fixing portion 56 to be provided in the operating cam 40 as in the existing method, the spring fixing portion 56 is preferably provided in the guide bush 50.

Recessed holes 42 are formed in the inner wall of the bush coupling hole 41 of the operating cam 40, and pressing protrusions 53 are formed on the outer peripheral surface of the bush body 51 of the guide bush 50. The guide bush 50 is fixedly fitted into the bush coupling hole 41 of the operating cam 40 by press-fitting the pressing protrusions 53 into the recessed holes 42, so that the operating cam 40 rotates integrally with the guide bush 50.

Figure 10:
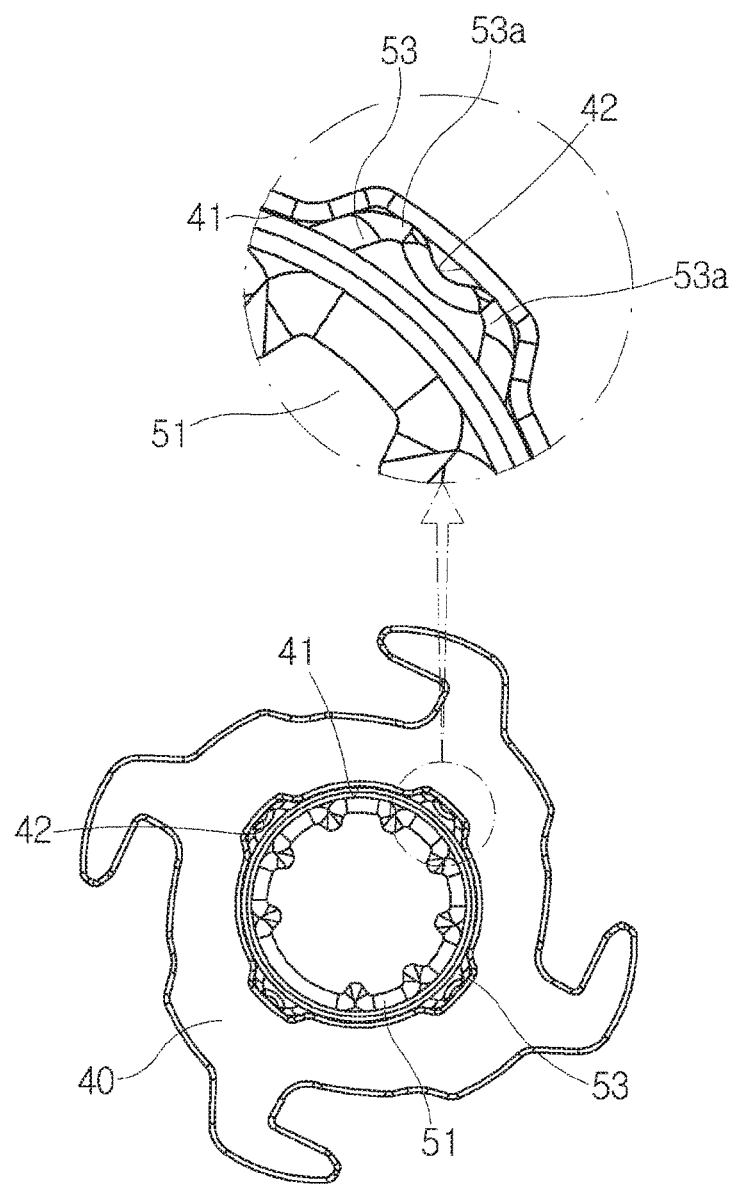
FIG. 10 is a top view of FIG. 9.

As illustrated in FIG. 10, the pressing protrusions 53 each have a plurality of convex ridges 53a such that each of the pressing protrusions 53 is pressed by contact with the inner wall of the associated one of the recessed holes 42 at multiple pressing points. For example, the recessed hole 42 has a trapezoid shape, and the pressing protrusion 53 has two ridges 53a so as to come into contact with the inner wall of the trapezoid-shaped recessed hole 42 at four pressing points. Each of the ridges 53a has a convex curved surface, and comes into contact with the inner wall of the trapezoid-shaped recessed hole 42 at two points. Thus, the pressing protrusion 53 may be easily pressed against the recessed hole 42, compared to whole surface contact between them. However, the pressing protrusion 53 may have a circular or polygonal shape besides the trapezoid shape.

The spring fixing portion 56, which supports one end of the cam spring 60, is formed at one side on the outer peripheral surface of the bush body 51 of the guide bush 50. The plate holder 10 is formed with a stopper protrusion 12 that supports the end of the cam spring 60.

Figure 11:
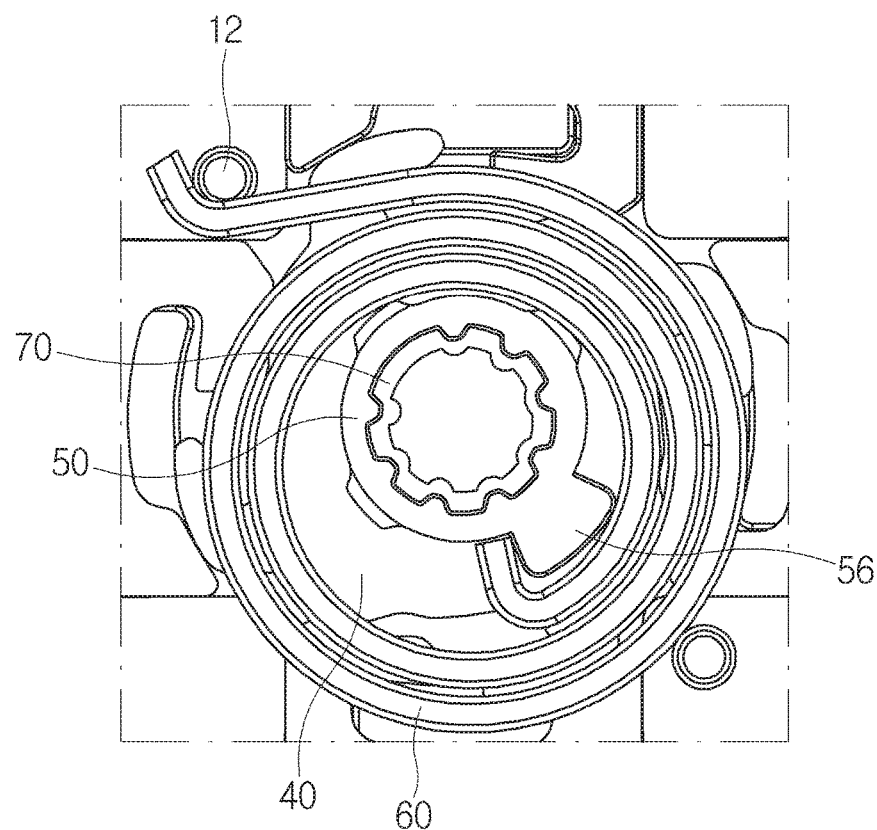
FIG. 11 is a side view of a coupling state of a cam spring illustrated in FIG. 4.

As illustrated in FIG. 11, the cam spring 60 is a spiral spring, and applies an elastic restoring force to the operating cam 40 in such a manner that one end of the cam spring 60 is supported by the stopper protrusion 12 of the plate holder 10 and the other end thereof is supported by the spring fixing portion 56 of the guide bush 50.

The spring fixing portion 56 is formed on and protrudes radially from the outside of cam spring 60 to support one end of the cam spring 60. Since the spring fixing portion 56 is formed at one side of the guide bush 50 in this way, the bush coupling hole 41 of the operating cam 40 may be enlarged enough to receive the hollow operation shaft 70 having a larger diameter than the existing one.

Figure 9:
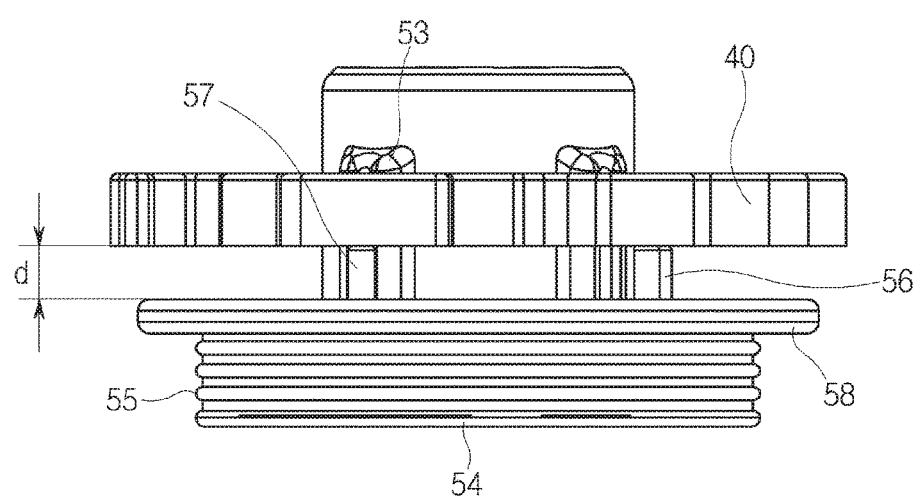
FIG. 9 is a side view illustrating a state in which a guide bush is coupled to an operating cam in FIG. 4.

As illustrated in FIG. 9, the spring fixing portion 56 protrudes in the axial direction of the bush body 51 so as to be slightly higher (have a height of 0.1 mm or more) than at least the thickness of the cam spring 60. Accordingly, when the operating cam 40 is fitted to the guide bush 50, the spring fixing portion 56 prevents the operating cam 40 from being axially inserted over the thickness of the cam spring 60, with the consequence that an accommodation space d, in which the cam spring 60 is able to smoothly operate, is secured between the guide bush 50 and the operating cam 40. The guide bush 50 includes a boss 54, and a sleeve 58 that extends radially from the end of the boss 54 to come into surface contact with the side of the cam spring 60. The sleeve 58 extends corresponding to the size of the cam spring 60, and supports the cam spring 60 such that the cam spring 60 smoothly moves on the plane in a state in which it is seated between the sleeve 58 and the operating cam 40.

In addition, a spring stopper 57 is formed at a side opposite to the spring fixing portion 56 on the outer peripheral surface of the bush body 51. The spring stopper 57 protrudes by the same thickness as the spring fixing portion 56, and prevents the axial insertion of the operating cam 40 together with the spring fixing portion 56. As a result, the accommodation space d, in which the cam spring 60 is able to smoothly operate, is secured between the guide bush 50 and the operating cam 40.

In other words, the guide bush 50 provides the accommodation space d, in which the cam spring 60 is able to smoothly operate, by means of the spring fixing portion 56, the spring stopper 57, and the sleeve 58.

The guide bush 50 has the boss 54 fitted to the sector tooth 20. The sector tooth 20 has a second through-hole 22 into which the boss 54 of the guide bush 50 is fitted.

The boss 54 has a sealing protrusion 55 that is formed on the outer peripheral surface thereof to prevent the solution for the electrodeposition from being introduced between the boss 54 and the sector tooth 20. The sealing protrusion 55 is circumferentially formed on the outer peripheral surface of the boss 54 while protruding to the inner wall of the second through-hole 22 of the sector tooth 20. The sealing protrusion 55 consists of a plurality of sealing protrusions that are spaced apart from each other by a predetermined distance to prevent the solution for the electrodeposition from infiltrating into the sector tooth 20 in multiple ways.

Each of the sealing protrusions 55 is circumferentially formed on the outer peripheral surface of the boss 54 to have an annular shape, and is spaced apart from the other sealing protrusions 55. That is, the sealing protrusions 55, which are not formed in a continuous helical form such as a thread or a screw but each has an individual annular shape, are spaced apart from each other by a predetermined distance and thus form double or triple partition walls.

Accordingly, the solution for the electrodeposition is stuck before continuously passing through the layered sealing protrusions 55 even though a portion of the solution for the electrodeposition infiltrates into the outermost sealing protrusion 55. Therefore, the solution for the electrodeposition stuck between the sealing protrusions 55 and the inner wall of the second through-hole 22 is prevented from infiltrating and the external solution for the electrodeposition is prevented from additionally infiltrating by the sealing protrusions 55.

As is apparent from the above description, a reclining device for a vehicle seat according to the present invention is effective in preventing the solution for the electrodeposition from infiltrating into the reclining device, in securing a space in which a cam spring is smoothly operated, and in contributing to a reduction in weight by use of a hollow shaft.

Although the present invention has been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments.

It is to be understood that differences relevant to the variations and modifications fall within the spirit and scope of the present disclosure defined in the appended claims.

What is claimed is:

1. A reclining device for a vehicle seat, which is provided between an upper bracket connected to a seat back frame and a lower bracket connected to a seat cushion frame so as to adjust an angle of the seat back frame, the reclining device for a vehicle seat comprising:
   a plate holder coupled to the lower bracket and having a plurality of guide protrusions formed on one surface thereof;
   a sector tooth rotatably coupled to the plate holder and having an internal gear formed on an inner peripheral surface thereof;
   a pawl tooth slidably provided in a space between the guide protrusions and having an external gear engaged with the internal gear of the sector tooth;
   an operating cam configured to move the pawl tooth by rotation thereof to engage the external gear with the internal gear of the sector tooth;
   a guide bush integrally and rotatably coupled to the operating cam and having a first through-hole formed in a center thereof, the guide bush comprising a spring fixing portion formed at one side thereof;
   an operation shaft spline-coupled to the first through-hole of the guide bush to rotate the operating cam; and
   a cam spring, one end of which is supported by the plate holder while the other end thereof is supported by the spring fixing portion of the guide bush, so as to restore the operating cam rotated by the operation shaft, wherein the guide bush comprises a boss fitted to the sector tooth, and a sealing protrusion formed on an outer peripheral surface of the boss to prevent a solution for an electrodeposition from being introduced between the boss and the sector tooth.

2. The reclining device according to claim 1, wherein the operation shaft is a hollow shaft.

3. The reclining device according to claim 1, wherein the operating cam is formed with a bush coupling hole into which the guide bush is fitted, the guide bush comprises a tubular bush body fitted into the bush coupling hole of the operating cam, a recessed hole is formed in an inner wall of the bush coupling hole, a pressing protrusion is formed on an outer peripheral surface of the bush body to be press-fitted into the recessed hole, and the pressing protrusion has a plurality of convex ridges such that the pressing protrusion is pressed by contact with an inner wall of the recessed hole at multiple pressing points.

4. The reclining device according to claim 3, wherein:
the recessed hole has a trapezoid shape; and
the pressing protrusion has two of the ridges so as to come into contact with the inner wall of the trapezoid-shaped recessed hole at four of the pressing points.

5. The reclining device according to claim 3, wherein the spring fixing portion protrudes in an axial direction of the bush body so as to secure an accommodation space, in which the cam spring is operable, between the guide bush and the operating cam by preventing the operating cam from being axially inserted at least over a thickness of the cam spring when the operating cam is fitted on the bush body.

6. The reclining device according to claim 3, further comprising a spring stopper formed at a side opposite to the spring fixing portion on the outer peripheral surface of the bush body while protruding by the same thickness as the spring fixing portion, so as to secure an accommodation space, in which the cam spring is operable, between the guide bush and the operating cam by preventing the operating cam from being axially inserted over a thickness of the cam spring when the operating cam is fitted on the bush body.

* * * * *